United States Patent [19]

Bartley

[11] 3,817,440
[45] June 18, 1974

[54] AUTOMATIC WELDING APPARATUS
[75] Inventor: John E. Bartley, Aptos, Calif.
[73] Assignee: Zeta International Engineering, Inc., Santa Clara, Calif.
[22] Filed: Aug. 21, 1972
[21] Appl. No.: 282,025

[52] U.S. Cl. ............... 228/29, 219/124, 228/32
[51] Int. Cl. ............................................. B23k 5/00
[58] Field of Search ............... 228/25, 29, 32, 45; 219/60.1, 124, 126, 125; 269/287

[56] References Cited
UNITED STATES PATENTS

| | | | |
|---|---|---|---|
| 3,207,408 | 9/1965 | Thome et al. | 228/29 |
| 3,380,148 | 4/1968 | Nelson et al. | 228/29 X |
| 3,387,761 | 6/1968 | Pickard | 228/42 |
| 3,458,105 | 7/1969 | Valentine | 228/44 |
| 3,604,612 | 9/1971 | Miller et al. | 228/29 X |

Primary Examiner—Robert D. Baldwin
Assistant Examiner—Robert J. Craig
Attorney, Agent, or Firm—Snyder, Brown and Ramik

[57] ABSTRACT

An automatic welding apparatus includes a track assembly of sectional arcuate form having air-inflatable pads for reacting against a cylindrical surface to hold the apparatus in place. The track assembly presents circular tracks and a circular rack and a carriage assembly is supported on the tracks. A drive motor and associated drive gear is movably carried by the carriage assembly for movement into and out of operative engagement with the rack and the welding assembly is adjustably positioned and supported by the carriage assembly for radial in and out movement with respect to the cylindrical surface and an adjacent joint to be welded as well as up and down in a plane axial with respect to the cylindrical surface. The welding assembly includes a welding head which is mounted for angular adjustment with respect to the cylindrical surface in an axial plane and a spool of welding wire is swingably carried by the carriage assembly so as to remain aligned with the welding head to obtain a substantially straight and axial infeed of wire to the welding head.

6 Claims, 13 Drawing Figures

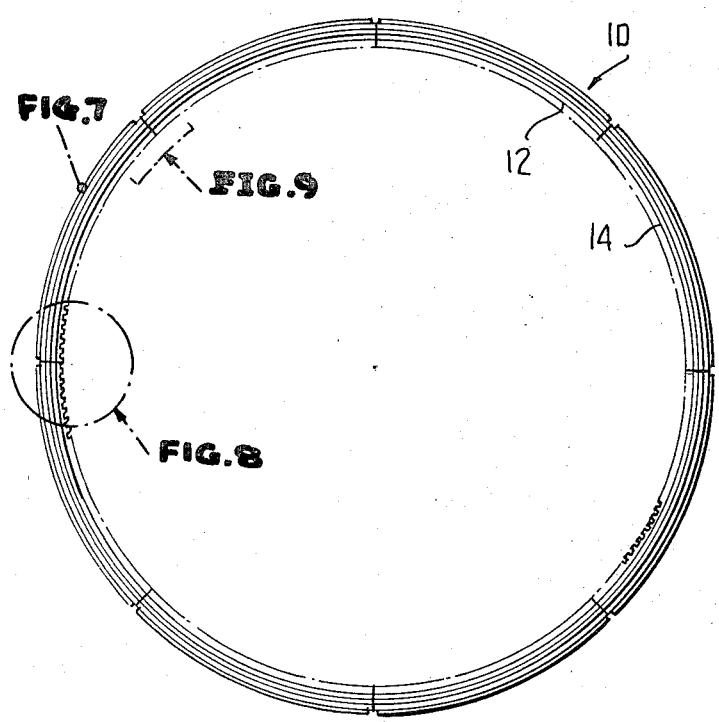
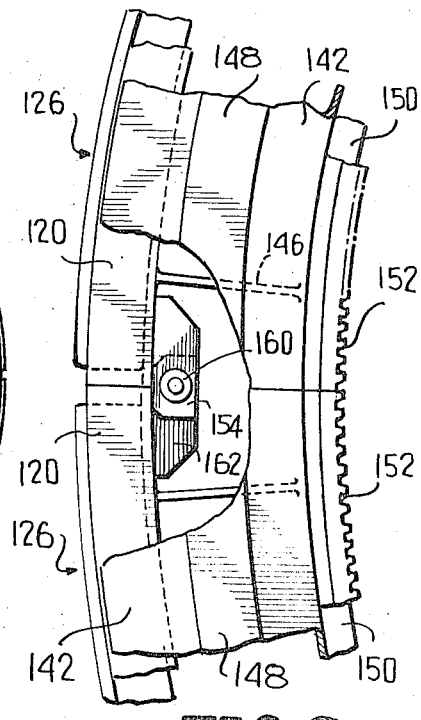
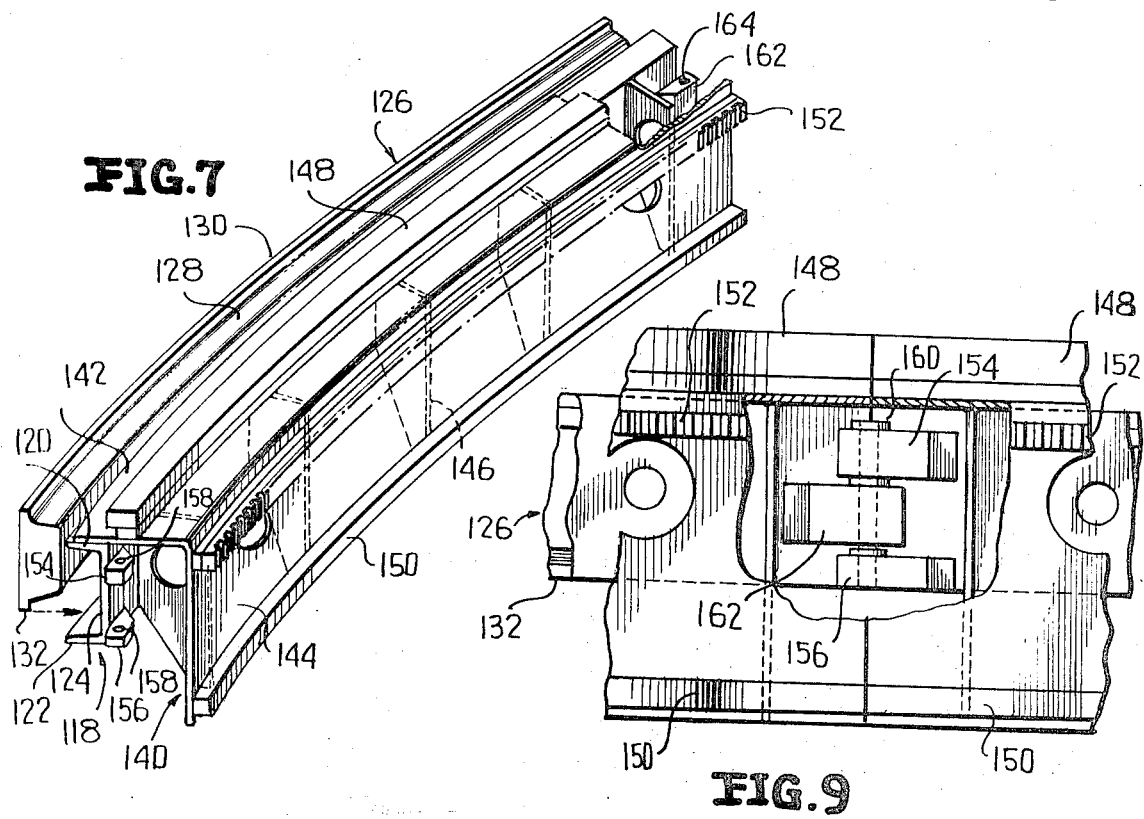

AUTOMATIC WELDING APPARATUS

BACKGROUND OF THE INVENTION

In many applications, weld joints have to be made which must meet rigid requirements and specifications. Although such weld joints can be made by a highly skilled welder it is in many ways preferable to use an automatic welding apparatus for this purpose.

Techniques of automatic welding are in general well known and production machines are quite common where the work to be welded is brought to the machine, welded and then removed so that the machine may receive the next piece of work. In many instances, however, the weld must be effected at the job site as for example in conjunction with the erection of an electric power generation plant. At such installations, notably in conjunction with a nuclear reactor electric power generation plant, a weld joint may be required in association with a cylindrical member of substantial diameter. Automatic welding in association with such an environment poses serious problems particularly as regards the manner in which the welding apparatus proper is to be supported so as tp traverse the lengthy weld joint accurately and uniformly.

BRIEF SUMMARY OF THE INVENTION

Accordingly, it is of primary concern in connection with the present invention to provide an automatic welding apparatus which includes a track assembly of sectional form which is engaged upon and derives support from an associated cylindrical surface adjacent the joint to be welded and which sections individually are of sufficiently light weight as to enable them manually to be positioned, connected together and properly engaged with the cylindrical surface whereafter the welding assembly may be engaged upon the erected track structure for subsequent movement therealong while the automatic welding takes place.

The welding apparatus includes a carriage assembly and associated drive mechanism for controlling movement along the track assembly and the carriage assembly adjustably supports a welding assembly for vertical up and down movement relative to the cylindrical surface as well as radial in and out movement with respect thereto so as properly to position the welding head so carried by the carriage assembly. The welding assembly includes the aforesaid welding head or tip and same is capable of angular movement in an axial plane with respect to the cylindrical surface so as properly to be directed with respect to the joint. The welding wire is delivered to the welding head from a supply spool which is adjustably or swingably mounted for positioning relative to the angularly adjusted position of the welding head so as to feed the welding wire in a straight line thereto.

BRIEF DESCRIPTION OF THE DRAWING FIGURES

FIG. 6 is a diagrammatic plan view illustrating the sectional track assembly;

FIG. 7 is a perspective, phantom view with parts broken away illustrating certain details of a track section;

FIG. 8 is an enlarged plan view as indicated in FIG. 6 illustrating certain details of the track section connections;

FIG. 9 is an enlarged view of the intersection of two track sections as indicated in FIG. 6 and with parts broken away illustrating certain details of construction;

DETAILED DESCRIPTION OF THE INVENTION

Figure 1:
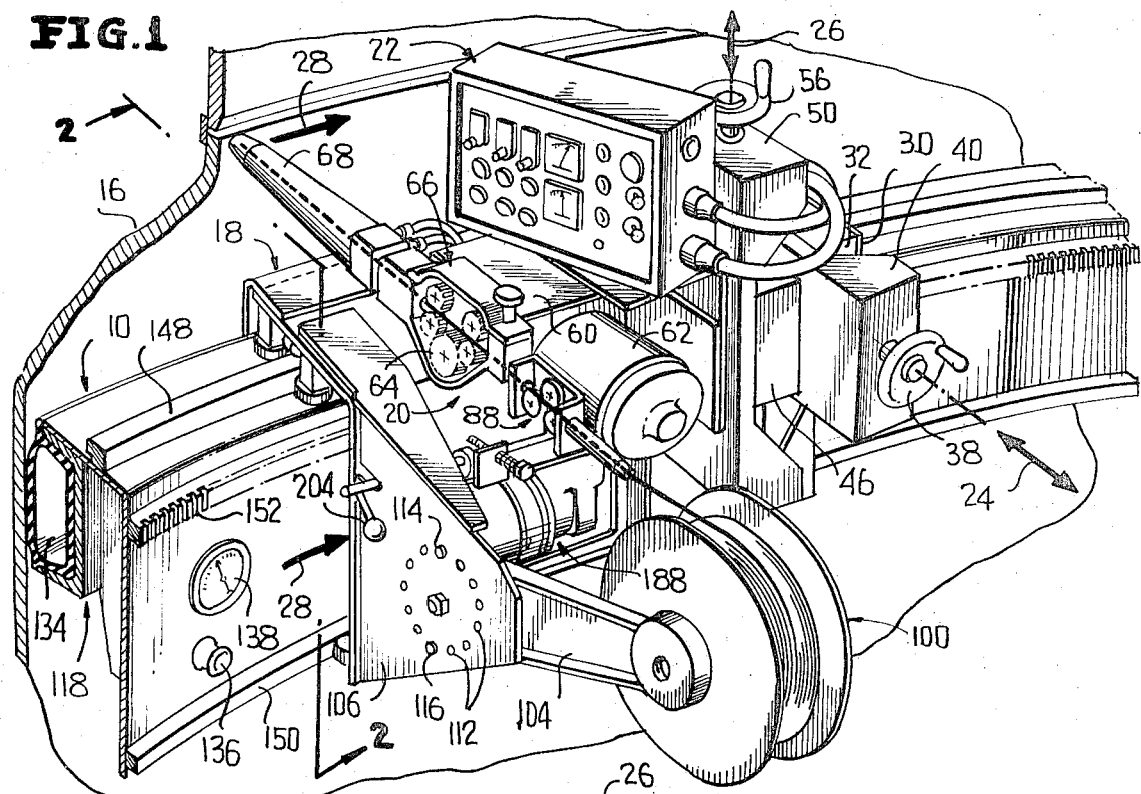
FIG. 1 is a perspective view, partially in section, illustrating a preferred embodiment of the present invention.
Figure 2:
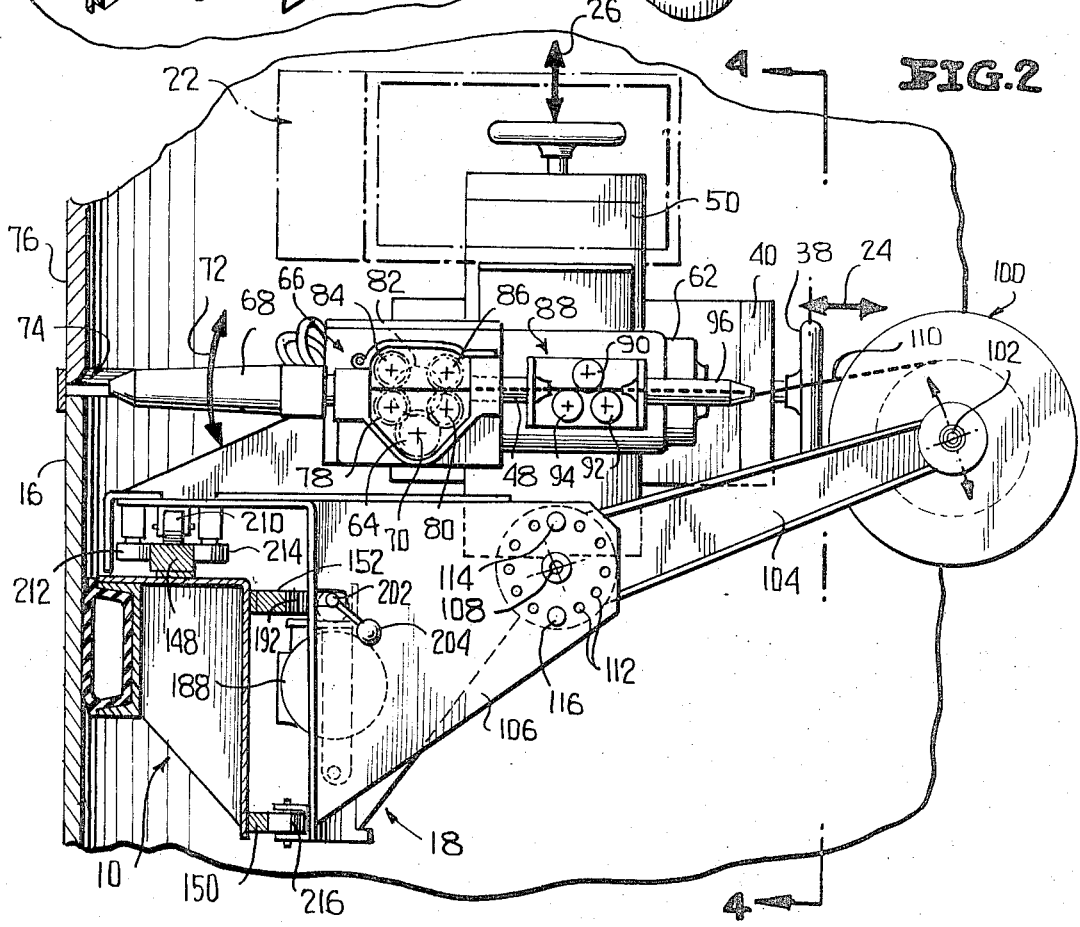
FIG. 2 is a vertical section taken substantially along the plane of section line 2—2 in FIG. 1 and illustrating certain adjustments of component parts of the apparatus.

With reference first to FIG. 6, a track assembly is indicated generally therein by the reference character 10 and will be seen to consist of adjacent arcuate sections 12, 14, etc. which are coupled together in a manner hereinafter described at the job site within the interior of a cylindrical member 16 as shown in FIGS. 1 and 2. As is shown in FIG. 1, the welding apparatus includes, in addition to the track assembly 10, a carriage assembly indicated generally by the reference character 18 and, positioned and supported thereby, a welding assembly indicated generally by the reference character 20. To complete the assembly, although the details of which are not necessary for an understanding of the present invention, there is provided a welding control console 22 supported on the welding assembly.

FIG. 1 also diagrammatically illustrates by means of the arrows 24 and 26 the radial in and out adjustment or positioning which may be effected and the vertical up and down movement which may also be effected, both of which are for the purpose of properly positioning the welding assembly as will become apparent hereinafter. FIG. 1 also illustrates by the arrows 28 the directional movement imparted to the carriage by the associated drive means hereinafter more particularly described.

Figure 5:
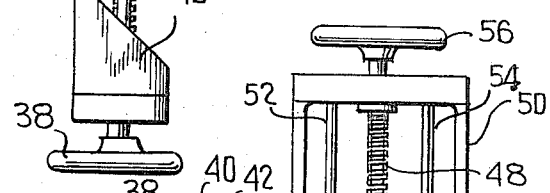
FIG. 5 is a vertical section taken substantially along the plane of section line 5—5 in FIG. 4 showing the two axis positioning mechanism for the welding assembly.
Figure 4:
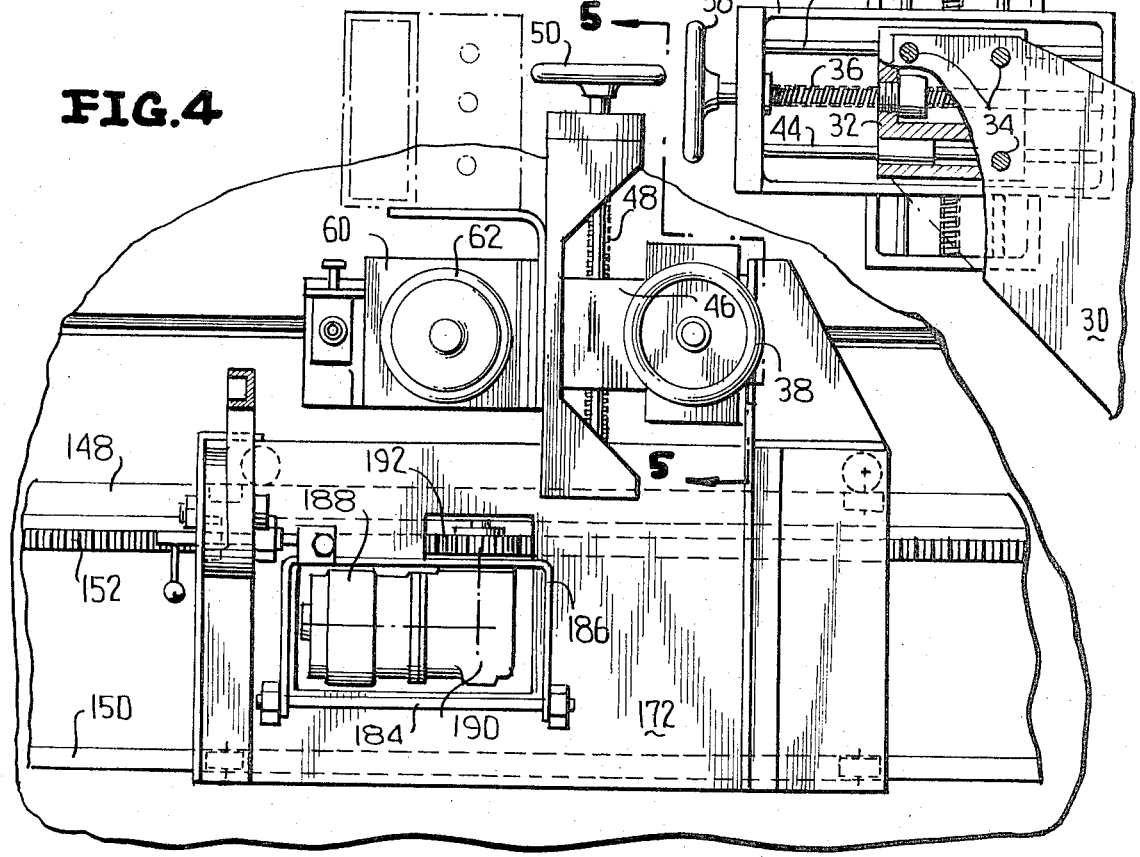
FIG. 4 is a vertical section taken substantially along the plane of section line 4—4 in FIG. 2 showing certain details of the drive mechanism and also illustrating further the positioning mechanism.

The manner in which the movements indicated by the arrows 24 and 26 are imparted to the welding assembly relative to the carriage assembly will be more apparent from a study of FIG. 5. In FIG. 5, a bracket arm portion 30 of the carriage assembly is illustrated as having the support member 32 rigidly attached thereto as by means of suitable fasteners 34. The member 32 is of block form and is provided with a threaded portions receiving the lead screw 36 to which the handle 38 is attached so that when rotated, the lead screw 36 feeds axially with respect to the member 32. The lead screw 36 is rotatably carried by the frame assembly 40 which includes the parallel guide rods 42, 44 slidably received in axial bores in the member 32 so as to achieve the requisite guide and rectilinear support of the frame 40 relative to the member 32.

The frame 40 includes a block portion 46 which in general corresponds to the member 32 carried by the carriage assembly and which portion 46 threadedly engages with the lead screw 48 carried by the vertical adjustment assembly 50. The vertical adjustment frame also includes the guide rods 52 and 54 engaging with the member 46 and the lead screw 48 is connected with a hand wheel 56 for effecting the vertical positioning as indicated by the arrow 26.

The frame 50 mounts a wire feed gear box 60 and associated wire feed motor 62. The gear box 60 changes direction of the drive and has an output shaft projecting laterally with respect to the motor 62 to which a drive gear 64 is attached and about the axis of which drive or output shaft the wire feed assembly 66 is rotatably positionable for the purpose of angularly adjusting the position of the welding head or tip 68 which is rigidly carried by the assembly 66. This angular adjustment takes place about the center 70 coincidental with the axis of the output shaft of the gear box 60 as is shown in FIG. 2 thereby to achieve the rotational angular adjustment of the welding head or tip 68 as indicated by the arrow 72, the weld joint 74 being between the aforesaid cylindrical member 16 and the cylindrical member 76 surmounting the same as shown.

The wire feed mechanism 66 is of entirely conventional configuration and construction and includes, in addition to the aforesaid drive or output gear, a pair of wire feed gears 78 and 80 against which the wire 82 is engaged through the idler gears 84, 86. Mounted on the wire feed 66 and located behind it is a wire straightening mechanism 88 also of conventional configuration which includes three idler straightening rolls 90, 92 and 94 which engage that length of wire exposed between the inlet guide tube 96 and the outlet guide tube 98. The welding wire issues from a supply spool or reel 100 rotatably carried about the axis of the support shaft 102 carried by the swing arm 104 affixed to the bracket arm 106 of the carriage assembly. The swing arm 104 is rotatably mounted for adjustment about the center of the support pin 108 so as to be adjusted into angular position such that the wire length 110 issuing from the supply spool 100 and entering the inlet guide 96 is on a straight line or substantially straight line with and in alignment with such guide tube 96. For this purpose, the bracket arm 106 is provided with a plurality of circumferentially spaced holes 112 for receiving fasteners 114 and 116 to achieve the requisite adjustment of the swing arm 104. The position of the swing arm 104 is not finalized in FIGS. 1 and 2 to illustrate the fact that this adjustment is effected and finalized when the vertical positioning of the welding assembly as indicated by the arrow 26 and the angular positioning as indicated by the arrow 72 themselves have been finalized.

Referring now more particularly to FIGS. 7, 8 and 9, the configurations of the track sections will be ascertained therefrom. Each track section includes an arcuate channel member 118 having its upper and lower legs 120 and 122 respectively projecting outwardly from the web portion 124 and received in each such channel section is a resilient hollow pad 126 having a main body portion 128 which is received within the associated channel section and having also upper and lower lips 130, 132 to seat against the outer edges of the legs 120 and 122. The hollow interior of each pad, as shown at 134 in FIG. 1, has a connection to an external fitting 136 by means of which the interior 134 may be subjected to internal air pressure to inflate the pad. Preferably a pressure guage 138 is associated with each such pad and the fitting 136 also acts to allow pressure to be bled therefrom so as to adjust all of the pad interiors to the same pressure, as will hereinafter be more apparent.

Attached to each channel 118 is an arcuate angle member 140 having a horizontal leg 142 and a depending skirt portion 144. The leg portion 142 is rigidly affixed upon the upper leg 120 of the channel section and suitable gussets or braces 146 are integrally joined to the channel section and to the angle member 140 to rigidify the entire assemblage. An arcuate upper track 148 is secured upon the upper surface of the leg portion 142 and an arcuate lower track 150 is secured rigidly to the skirt 144 adjacent the lower edge thereof, as shown. Additionally, each track section includes an arcuate rack portion 152 which, like the tracks 148 and 150, extend to and between the opposite end edges of the angle member 140, substantially as is shown. At one end of each track section there are provided a pair of fastening lugs 154 and 156 provided with aligned apertures 158 to receive coupling pins such as that indicated by the reference character 160 in FIG. 8. At the other end of each section there is a single lug 162 provided with an aperture 164 and, as will be evident, the single lug 162 of one track section fits between the lugs 154 and 156 at the next track section and the coupling pin 160 secures them together. In this way, the two tracks 148 and 150 as well as the rack 152 are continuous, being disposed in abutting relationship between adjacent track sections as is shown clearly in FIG. 8.

The individual track sections are of sufficiently light weight as readily to be manipulated by two men and the entire track assembly may be joined together while temporarily supported and thereafter the pads 126 may be inflated and their pressures adjusted as aforesaid support the assemblage rigidly in place. The resilient, inflatable pads exert a substantially even pressure circumferentially and effect a very rigid interconnection between the surface of the member 16 and the track assembly.

Figure 10:
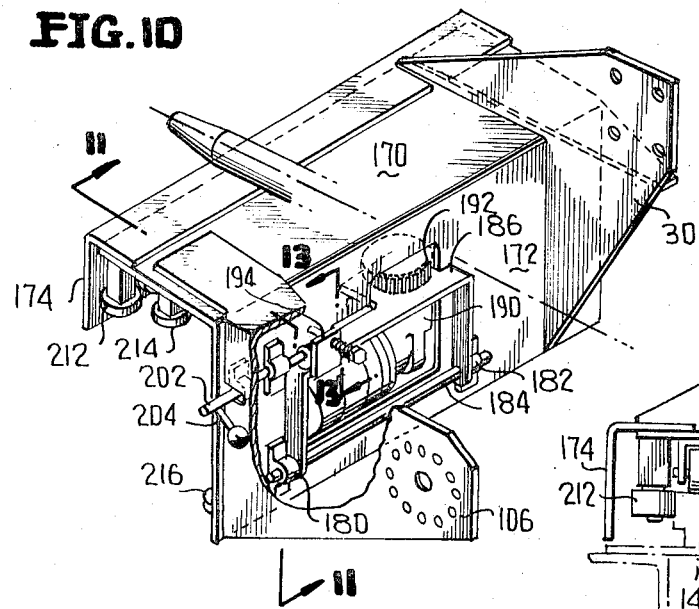
FIG. 10 is a perspective view, portions being broken away, illustrating the carriage assembly.
Figure 11:
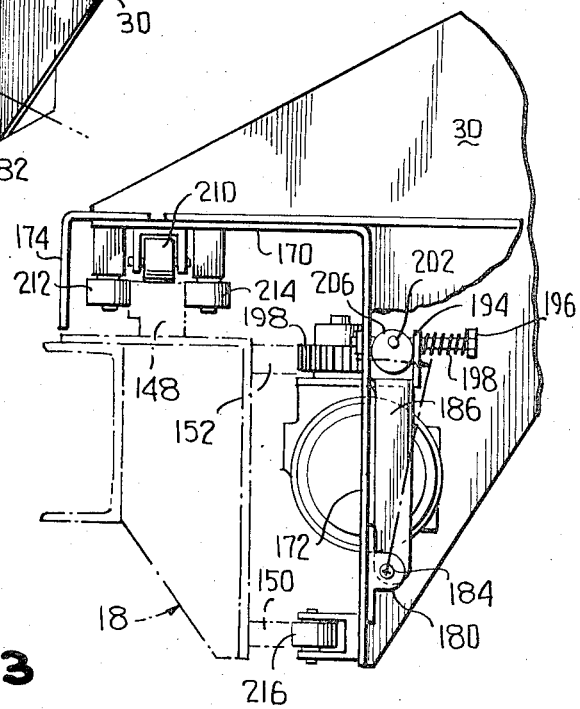
FIG. 11 is an enlarged view as indicated by section line 11—11 in FIG. 10 and showing details of the carriage assembly and of the drive therefor.
Figure 13:
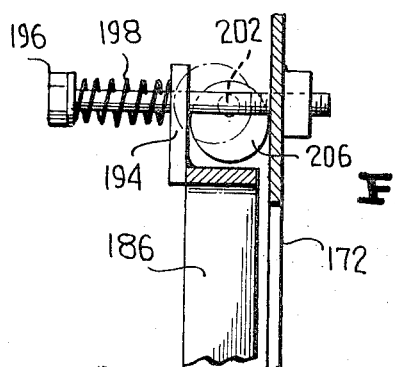
FIG. 13 is an enlarged view taken substantially along the plane of section 13—13 in FIG. 10 showing details of the drive engaging mechanism.

The carriage assembly is a fabricated unit having a length of angle member as the main structural unit thereof. This angle member includes the horizontal leg portion 170 and the depending vertical leg portion 172 as can be seen most clearly in FIGS. 10 and 11. Additionally, there is a stiffening skirt member 174 secured to the outer edge of this angle member.

In addition to the members 30 and 106 previously described, the carriage assembly includes a pair of bearing support members 180, 182 on the depending member 172 which receive a hinge or pivot pin 184 mounting the frame 186 to which the drive motor 188 is attached. The drive motor includes a gear box 190 having an output shaft to which the drive pinion 192 is affixed, such drive pinion being adapted to engage with the rack 152 to drive the carriage at the proper speed along the track assembly during the welding operation.

As stated, the frame 186 is pivotally mounted on the carriage so that the drive pinion 192 may be moved into and out of engagement with the rack 152. For this purpose, the frame 186 includes a reaction plate 194, see particularly FIGS. 10 and 11 through which a bolt member 196 passes, being threadedly engaged in the member 172 to preload the compression spring 198 to the desired extent. A bearing member 200 rotatably supports the actuator shaft 202 which is provided with a hand knob 204 and this shaft 202 carries an eccentric 206 which may engage against the plate 194 and rock the motor assembly out of engagement with the rack 152. When the hand knob is actuated in the opposite direction, the compression spring 198 serves to swing the frame 186 and the motor drive assembly so as to engage the pinion 192 with the rack. As will be evident from FIGS. 10 and 11, the carriage member 172 is provided with a suitable cut out portion to receive the motor drive assembly.

Figure 3:
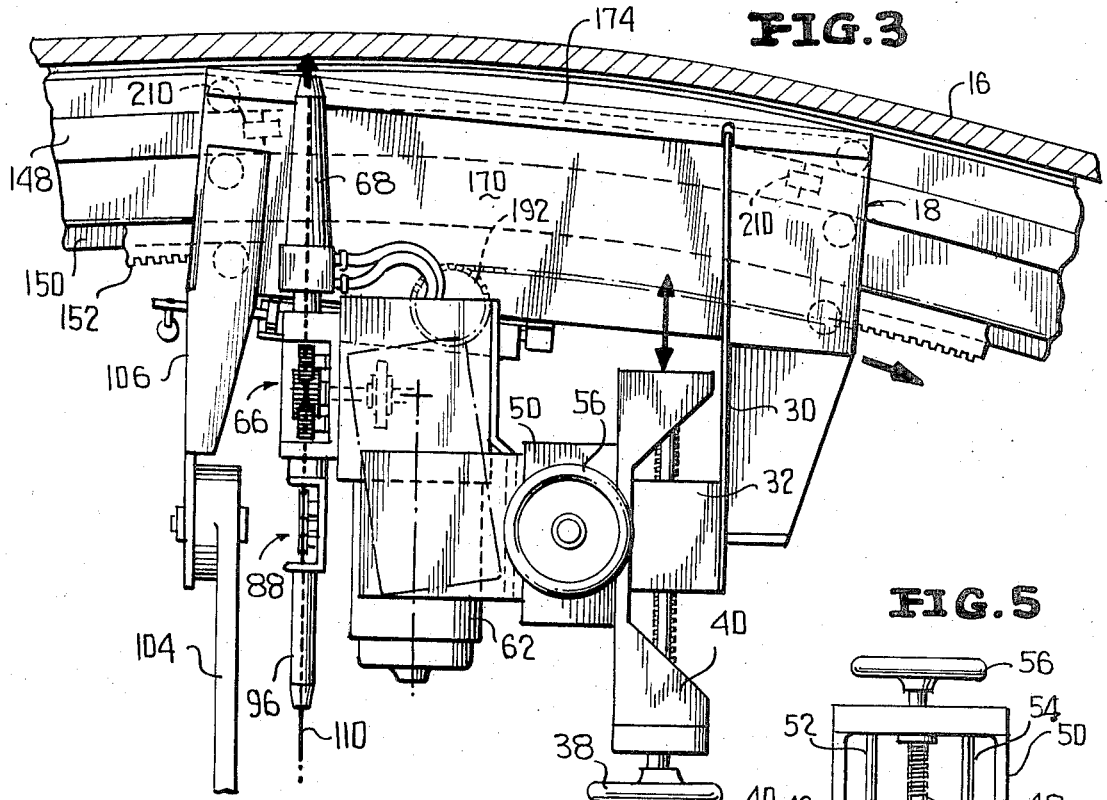
FIG. 3 is a top plan view of the assembly shown in FIG. 1 and further illustrating certain of the adjustments and movements of the apparatus.
Figure 12:
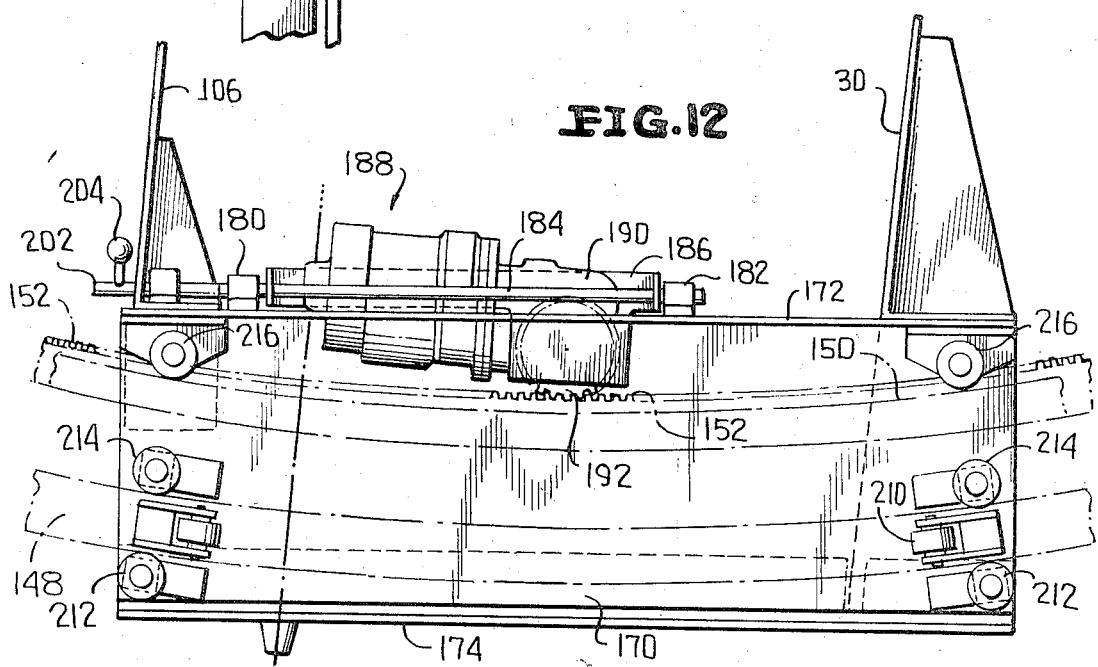
FIG. 12 is a bottom plan view of the carriage assembly in association with the track assembly.

To complete the carriage assembly, same is provided with a pair of rollers 210 centered on the proper radius as illustrated in FIG. 3 and also in FIG. 12, these support rollers being adapted to engage the upper surface of the track member 148 to bear the weight of the carriage assembly and associated mechanism carried and mounted thereon. Additionally, there are two pairs of upper guide rollers 212, 214 which engage against the inner and outer surfaces of the upper track 148 and additionally there are bearing rollers 216 which engage the inner side of the lower track 150.

It will be appreciated that the welding head 68 is of entirely conventional construction and for the purpose of clarity the details of same are not described herein. Suffice it to say that the welding head has suitable connection for water cooling, for welding current and for supply of inert gas as is conventional. As has been stated previously, the parameters of the welding operation are controlled by the console assembly 22 and again the details of the console and the particular operations it performs are of no consequence in connection with the present invention, same being of well known character.

It will further be understood that other operations could be performed other than welding as, for example, grinding and various machining operations, flame cutting and the like simply by mounting the proper machinery on the carriage assembly.

I claim:

1. An automatic welding apparatus for welding joints in large cylindrical structures comprising, in combination:

a track assembly adapted to engage against and derive support from a cylindrical surface adjacent a joint to be welded;

a carriage supported on said track assembly; and a welding assembly supported on said carriage for movement therewith;

said carriage including drive means for moving the carriage at welding speed along said track assembly and means for adjustably positioning said welding assembly radially in and out and axially relative to the cylindrical surface and adjacent joint;

said welding assembly including a welding head, means for adjusting said welding head angularly with respect to the cylindrical surface in an axial plane, and means for feeding an indefinite length of welding wire to the point being welded, wherein said track assembly comprises a plurality of arcuate track sections, said sections being of sufficient lightness to facilitate manual manipulation thereof, and means for demountably securing the sections together, and wherein each track section includes a peripherally-cradled, fluid-inflatable pad for expansion into supportive engagement with said cylindrical surface.

2. An automatic welding apparatus as defined in claim 1 including means for adjusting said means for feeding welding wire to maintain same in alignment with said welding head.

3. An automatic welding apparatus as defined in claim 1 wherein each of said track sections is equipped with means for introducing inflating fluid into said fluid-inflatable pad.

4. An automatic welding apparatus as defined in claim 3 wherein each of said track sections is equipped with means for measuring the pressure in the interior of said pad.

5. An automatic welding apparatus as defined in claim 1 wherein said track assembly derives support from the interior of said cylindrical surface.

6. An automatic welding apparatus as defined in claim 2 which includes a wire feed assembly mounted on said carriage and upon which the welding head is mounted, said wire feed assembly being rotatably positionable for the purpose of angularly adjusting the position of said welding head relative to said cylindrical surface, a wire straightener, a supply of welding wire, a reel which carries said welding wire, said reel being carried by a swing arm and said swing arm being adjustably mounted on said carriage for positioning relative to the angularly adjusted position of the welding head so as to feed the welding wire in a straight line thereto.

* * * * *